United States Patent [19]

Brown et al.

[11] Patent Number: 4,754,280

[45] Date of Patent: Jun. 28, 1988

[54] ATTITUDE SENSING SYSTEM

[75] Inventors: Alison K. Brown, Malibu; W. Michael Bowles, Long Beach, both of Calif.; Tom P. Thorvaldsen, Hingham, Mass.

[73] Assignee: The Charles Stark Draper Laboratory, Inc., Cambridge, Mass.

[21] Appl. No.: 416,646

[22] Filed: Sep. 10, 1982

[51] Int. Cl.$^4$ .......................... G01S 5/02; H04B 7/185
[52] U.S. Cl. .................................... 342/357; 342/420; 342/424
[58] Field of Search ............... 343/357, 394, 424, 420, 343/356, 396, 352; 318/580–582, 648, 649

[56] References Cited

U.S. PATENT DOCUMENTS

| | | | |
|---|---|---|---|
| 3,155,964 | 11/1964 | Voles | 343/5 PC |
| 3,680,124 | 7/1972 | Stone et al. | 343/424 |
| 3,702,477 | 11/1972 | Brown | 343/451 |
| 3,896,443 | 7/1975 | Zitzow | 343/396 |
| 3,935,574 | 1/1976 | Pentheroudakis | 343/424 |
| 4,232,313 | 11/1980 | Fleishman | 343/456 |
| 4,359,732 | 11/1982 | Martin | 343/5 CM |
| 4,368,469 | 1/1983 | Ott et al. | 343/352 |

Primary Examiner—Theodore M. Blum
Assistant Examiner—Gregory C. Issing
Attorney, Agent, or Firm—Weingarten, Schurgin, Gagnebin & Hayes

[57] ABSTRACT

An attitude sensing system which incorporates the precision in attitude sensing of a satellite navigation system with the dynamic tracking capabilities of an inertial measurement unit. Optimally estimated attitude and system error signals are combined with the outputs of an inertial measurement unit to control the phase differences of signals received on an interferometer array from a navigation satellite. The outputs from the inertial measurement unit and the phase differences are processed in an optimal estimator filter to produce periodically updated attitude and system error signals. This permits inertial attitude sensing to benefit from the long term accuracy of attitude estimation based upon signals from the satellite navigation system. During conditions of high dynamic maneuvering in which attitude changes are rapid, the output of the inertial measurement unit continues to provide attitude information and controls the attitude sensing loop to insure that the system is not disoriented by such high dynamic conditions.

5 Claims, 2 Drawing Sheets

ATTITUDE SENSING SYSTEM

FIELD AND BACKGROUND OF THE INVENTION

The present invention relates to attitude sensing as found in both the fields of inertial and satellite navigation systems. Satellite navigation receivers are known in which the signals from one or more navigation satellites are received and processed to provide attitude information. Interferometric techniques are utilized with a plurality of antennas to sense vehicle attitude relative to some base or inertial references. The receivers which track the satellite navigation signals are capable of extremely high attitude accuracy after they stabilize. Thereafter, their accuracy continues at a high level for indefinite periods. Such attitude information is important in space craft or surveying applications where pointing directions of high accuracy are necessary. In conditions of rapid vehicle maneuvering, the interferometric data changes too rapidly to be tracked by such navigation receivers and therefor attitude information is temporarily lost until the receiver can restabilize itself.

Inertial measurement units, typically consisting of three gyroscopes to detect rotation about three mutually orthogonal axes, as well as accelerometers to detect acceleration upon three mutually independent axes are known. Such units find applications in on board instrumentation such as for space vehicles and commercial aircraft. Inertial measurement units are capable of following with accuracy vehicle maneuverings at substantial rates. The inertial sensors of such inertial measurement units, however, are subject to error drift rates which, over time, contribute significant inaccuracies to the output indications of attitude.

SUMMARY OF THE INVENTION

In accordance with the teaching of the present invention, a satellite receiver system is utilized to provide long term correction of attitude data from an inertial measurement unit to compensate for drift and other errors of the unit. Basic attitude sensing is accomplished by the inertial measurement unit and can accommodate high rate vehicle maneuvering.

In particular, the system includes three or more physically separated antennas receiving signals from one or more navigation satellites. The signals from each of the several possible antenna pairs are processed in a phase adjusting loop which optimally estimates the difference in reception time for the signals of each antenna pair as a function of phase difference. Errors in these phase estimates are provided to a Kalman filter as the input states of a state vector. The filter also receives the output of the inertial unit and certain other system parameters. The filter provides as successive iterations a set of optimally estimated values for the states of a state output vector. The output vector includes system attitude, the relative positions of the respective antennas, and a set of error rate parameters for each of the three gyroscopes in the inertial measurement unit. These adjust delay lines within the phase adjusting loops to bring the phasing of each signal pair into coincidence. The remaining phase difference forms the error in phase estimate that is used as the input by the Kalman filter in the next iteration.

Data from the inertial measurement unit is provided at all times including periods of high dynamic motion to continuously control phase adjustments through the filter outputs. The filter then periodically processes satellite based inputs along with the inertial signals to provide updated attitude and error vectors in an ongoing process aimed at minimizing the phase errors and thus optimizing the accuracy of the attitude information. The Kalman filter also provides adjustments to the gyroscope information to permit the inertial signals to reflect the more long term accuracy of the satellite navigation information.

The system is initialized by data received from the navigation satellites indicating their position as well as an estimate of the position and attitude of the sensing system.

The positioning of the three or more satellite receiver antennas can be kept to manageable dimensions of, for example, one to ten meters utilizing the present system. This increases system portability and adaptability to spacecraft installation.

BRIEF DESCRIPTION OF THE DRAWING

These and other features of the present invention are more fully set forth below in the solely exemplary detailed description and accompanying drawing of which.

DETAILED DESCRIPTION OF THE INVENTION

The present invention contemplates an attitude sensing system in which basic attitude information is provided by an inertial measurement unit and used to adjust the interferometric signals from a satellite navigation receiver in an optimized loop which combines the ability of the inertial measurement unit to track relatively rapid vehicle changes in attitude with the ability of the satellite navigation system to provide long term accuracy. In particular, a microprocessor implemented satellite tracking loop is utilized to optimally estimate system attitude and selected errors from satellite and inertial inputs. These optimal estimates are used to not only define attitude but calibrate the inertial sensors to avoid long term error rates. At the same time, the attitude estimating system tracks the inertial measurement unit in high dynamic environments.

Figure 1:
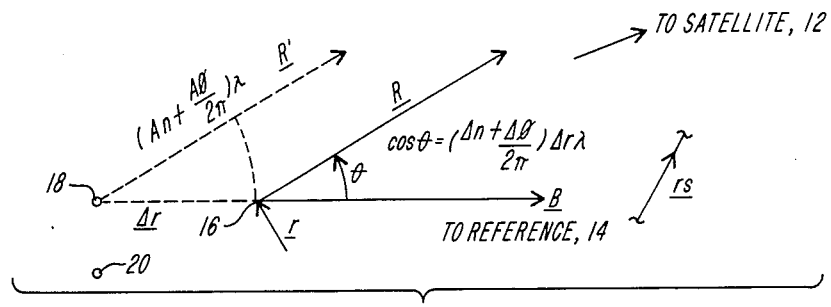
FIG. 1 ia a vector diagram useful in illustrating the operation of satellite navigation systems as applied to the present invention.

In describing the present invention reference is first made to FIG. 1 showing a vector diagram appropriate to the operation of the satellite receiver portion of the attitude sensing system of the present invention. As shown in FIG. 1, a satellite 12 will be located at some remote distance off the page in its earth orbit which causes it to cycle the earth every predetermined period of time. At any instant of time, the satellite 12 will be located at a point represented by a vector $r_s$ from some reference location typically associated with the earth and also located at a position off the page. The vehicle for which attitude is sought is represented by first, second, and third receiving antennas, 16, 18, and 20 respectively. The antenna 16 is positioned from the reference location 14 as defined by a vector r. The location of the antenna 16 relative to the satellite 12 is represented by a vector R.

The antennas 16, 18, and 20 are typically separated by a few meters, such as one to ten meters, and a vector Δr is utilized in the drawing of FIG. 1 to represent the position of the antenna 18 relative to the antenna 16 in the same coordinates used for the other vectors of FIG. 1.

A vector R' represents the vector from antenna 18 to the satellite 12 and differs from the vector R substantially only in length. Radio signals transmitted by the satellite 12 will be first received by antenna 16 because of the shorter length of the vector R and will be received subsequently at the antenna 18 due to the greater length of the vector R'. That difference in distance results in a phase difference between the signals received by antennas 16 and 18 and is represented by the formulation shown in FIG. 1. An angle θ represents the angle between the vector R and some base reference vector B and can be mathematically expressed as shown in FIG. 1.

$$\cos \theta = \left( \Delta n + \frac{\Delta \phi}{2\pi} \right) \Delta r \lambda$$

in which Δn represents the number of whole cycles in phase difference between the signals received by antennas 16 and 18, Δφ represents the remaining phase difference in degrees, and λ represents the wavelength of the satellite transmissions.

Using known interferometric techniques, the angle θ can be determined with great accuracies from the received signals. By using a similar known interferometric detection scheme employing the additional antenna 20, the spacecraft attitude relative to the satellite can be completely resolved free of all ambiguities and, from positional data on the satellite transmitted by it, can be converted to an attitude of the spacecraft or other vehicle referenced to the vector B defined relative to the earth.

Figure 2:
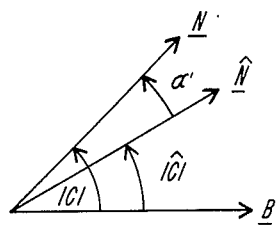
FIG. 2 is a vector diagram useful in explaining the operation of inertial measurement units as applied in the present invention.

With reference now to FIG. 2, the attitude vectors characteristics of the output of an inertial measurement unit are illustrated. A typical inertial measurement unit will include instrumentation for detecting rotation as well as acceleration about three mutually independent axes. From the rotation information, changes in attitude of the vehicle containing the inertial measurement unit can be determined with substantial accuracy particularly in the short run. As illustrated in FIG. 2, a vector N represents the actual attitude vector of the vehicle containing the inertial measurement unit relative to the reference vector B. The vector N is at an angle in three dimensional space represented by a matrix |C| in FIG. 2. The inertial measurement unit is typically instrumented to provide output signals corresponding to the matrix |C| representing the attitude vector Ñ for the vehicle as sensed by the inertial measurement unit. Typically the vectors N and Ñ will differ by some angle α in three dimensional space representing the error between the true attitude vector and that vector as measured by the inertial measurement unit. α is typically represented by a state vector consistent with the matrix notation.

The present invention utilizes the attitude information represented by the output of the inertial measurement unit, illustrated in FIG. 2, to provide a vehicle attitude signal but corrects that signal according to the attitude information gathered from a satellite receiver system. The correcting function utilizes an optimal estimation provided in a digital filter, such as a Kalman filter. The Kalman filter is provided with a number of inputs including the known system characteristics, initial position data, the inertial attitude matrix and other factors described below. System characteristics typically involve a drift rate for the inertial unit which increases the error from a substantially negligible error in the short term to a substantial error or uncertainty in the long term. The Kalman filter assumes the inertial measurement unit to be operating within those error boundaries. As the same time the Kalman filter receives information from the satellite receiver representing the phase differences between pairs of antennas, three or more of which are arranged in an interferometer array for each of one or more navigation satellites. The information applied to the Kalman filter represents the phase difference between each paired signal after that phase difference has been minimized in response to a correction signal, typically utilized to produce a delay on the first received signal from the appropriate one of the paired antenna. The error signal from a plurality of paired antenna phase differences is processed by the Kalman filter along with inertial unit outputs to produce optimal estimates of attitude for the vehicle, relationships positionally and angularly between the receiving antennas, and gyroscope error information. The estimates are periodically updated, such as every ten seconds to reflect satellite information and otherwise follow the inertial outputs. In conditions of relatively slow vehicle rotation these feedbacks are utilized to correct the attitude matrix from the inertial measurement unit and are then applied to readjust the delays in the receiving paths for the satellite signals from the paired antennas in order to reduce the phase error outputs. Over a period of time, the high accuracies of the satellite signal information will result in very accurate attitude information and high accuracy corrections of the inertial measurement unit outputs. In conditions of high vehicle maneuvering rates, the slow process of error removal by the Kalman filter processing cannot function, but at the same time the phase error outputs of satellite signal processing channels are kept relatively small by the ability of the inertial measurement unit to accurately track rapid movements and provide changes in its attitude output indications which track the vehicle motion with high short term accuracy.

Figure 3:
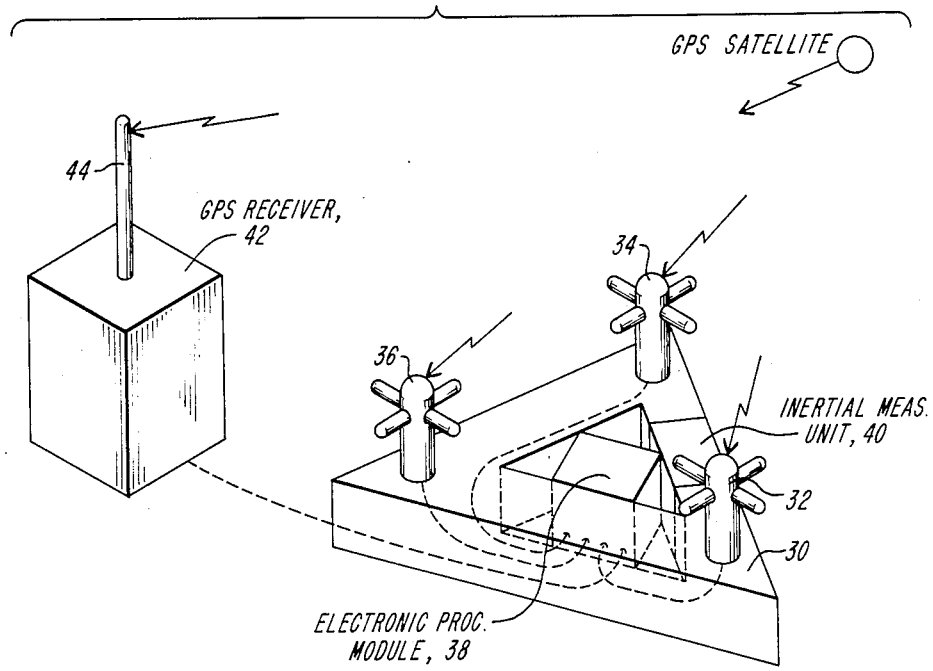
FIG. 3 is a diagram illustrating placement of the major components of the present invention.
Figure 5:
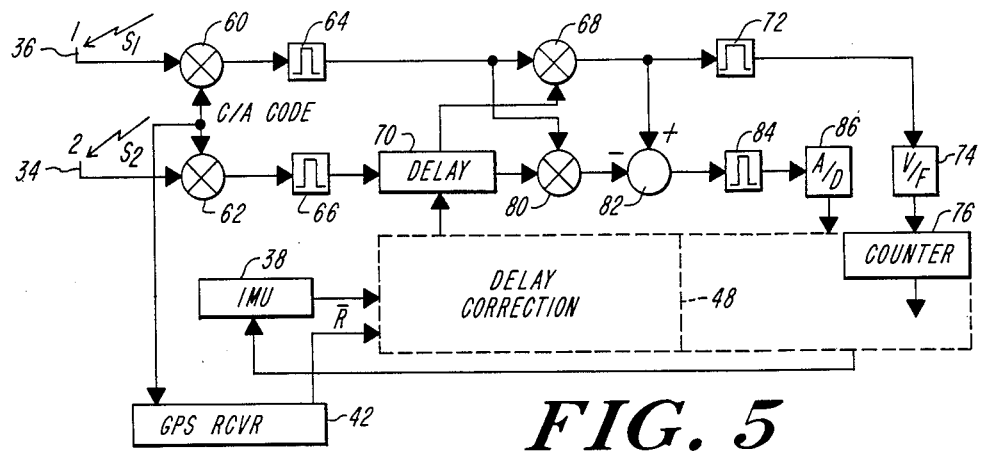
FIG. 5 is a circuit diagram of an adjustable phase loop utilized in FIG. 4.
Figure 4:
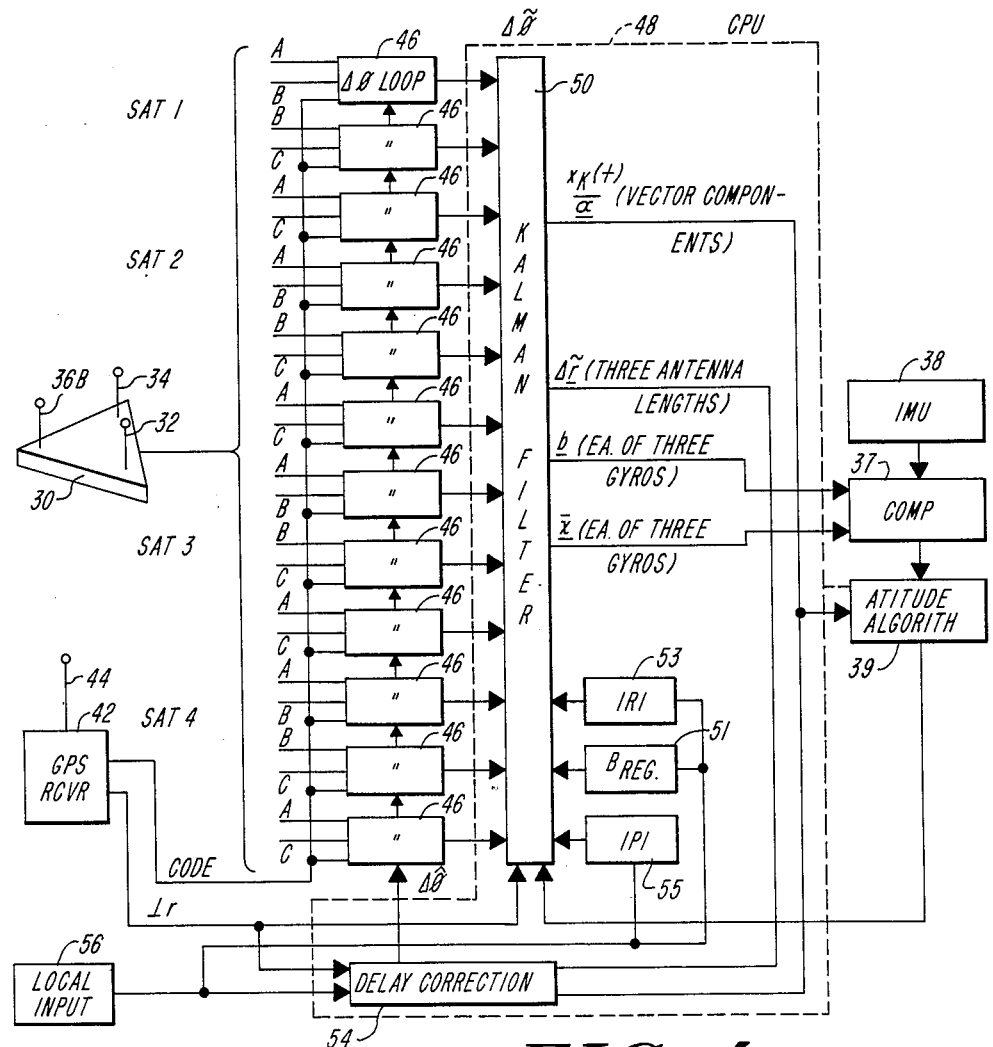
FIG. 4 is a system diagram illustrating the combination of satellite interferometric attitude sensing with inertial measurement unit attitude outputs in accordance with the present invention.

Circuitry according to the invention to accomplish this function is illustrated with respect to FIGS. 3–5.

A typical arrangement of physical components for a system according to the present invention is illustrated in FIG. 3. A base 30 has mounted thereon an array of at least three satellite signal receiving antennas 32, 34, and 36 positioned relative to each other at the apexes of a triangle to operate as an interferometer. Signals from these antennas are applied to a processing electronics module 38 to be described in detail below. Within the base 30 an inertial measurement unit 40, which may be of any conventional design known in the art, provides an output signal representiang an attitude matrix to the processing module 38. A global postioning system receiver 42, a satellite receiver, has a separate antenna 44 to receive satellite signals and to provide therefrom code and satellite position information which is similarly provided to the electronics module 38 for purposes to be described below.

With reference to FIG. 4 the circuitry for providing attitude sensing based on combined inertial measurement unit and satellite interferometer signals is illustrated. As shown in FIG. 4 the base 30 and associated antennas 32, 34, and 36 provide outputs, one signal from each antenna, to a set of adjustable phase loops 46. Each loop 46 receives the output from a pair of antennas, three loops being provided for each navigation satellite for which signals are being received. Thus, as shown in FIG. 4, three loops will be provided for each satellite, the first receiving signals from antenna 36 and antenna 34, the second from antenna 34 and antenna 32, and the last from antenna 36 and antenna 32. As will be described below with respect to FIG. 5, each loop 46 operates to process the signals received from each antenna pair to preserve only the carrier transmitted by the corresponding satellite and to phase shift these signals to bring them substantially into phase coincidence by delaying the first received signal. The delay magnitude represents an approximate value for the phase difference between the two signals, the remaining difference being an error output of each loop 46. This error output, designated as $\Delta\phi$ is applied to a central processor unit 48 and in particular to a digital Kalman filter 50. The Kalman filter is characteristic of a set of filtering or estimating techniques based upon state vector modeling of error capable linear systems. See Arthur Gelb, Applied Optimal Estimation, MIT press 1980, at chapter 4 pp. 102–155.

The system includes a digital filter operating as an optimal estimator to provide, from the outputs of the inertial attitude sensing unit and the satellite interferometer, along with parameters of system characteristics and initial position estimates, periodically updated optimal estimates of attitude and selected error parameters as a multidimension state vector output. These signals are used to provide calibration of the inertial attitude sensor to compensate for long term drift. They are combined with the inertial sensor signals, as calibrated, on an ongoing basis between updates, to adjust the phase so as to track vehicle motion and maintain minimized phase difference.

The Kalman filter 50 is x, in the embodiment of FIG. 4, programmed operation of the microprocessor 48 which accomplishes the functions of a Kalman filter according to a set of state equations specified below acting on the various inputs shown. The Kalman filter provides outputs which can be viewed as a state vector, $\hat{x}$, defined as follows:

$\hat{x}^T = [\underline{\alpha}^T, \{\Delta r^T, b^T, \underline{\psi}^T\}]$; T designating "transpose"

where $\alpha$ is defined in FIG. 2
$\Delta \bar{r}$ is change in $\Delta r$ defined in FIG. 1
$\underline{b}$ is gyroscope constant angular rate bias, one for each gyroscope
$\psi$ is the first order Markov process in the gyroscope measured angular rate
The later two variables are standard and gyroscope error factors and operate on the inertial rate output C, $\dot{\underline{\alpha}} = C(\underline{b} + \underline{\psi} + \underline{n})$ where n is noise.

It is to be noted that the state vector $\hat{x}$ has twelve state variables. The invention can operate with the first three, $\underline{\alpha}$, output alone although all twelve are shown to illustrate a greater range of features for the invention.

The first two sets of three outputs, $\underline{\alpha}$ representing the estimate in the attitude error state vector, and $\Delta \bar{r}$ representing the estimate in the vector error between the receiving antenna, are applied to a delay correction unit 54. The vector error actually accounts for circuitry variations as well as position variations between received signals.

The inertial measurement unit 38 provides an output signal representing rotation rate from which an uncompensated Cu matrix is found using digital processing in a compensation unit 37 based on the relations $\dot{C}u = -Cu\Omega$, as is conventional in the inertial measurement systems. $\Omega$ is defined by the characteristics of the gyroscopes in the unit 38.

Compensation unit 37 compensates the uncorrected data receive with the $\underline{b}$ and $\psi$ states. These are used to correct Cu for bias and first order Markov process errors as is known in the art. This partially corrected signal, Cp, is digitally processed according to an attitude algorithm 39 which defines the C matrix as, $C = |\underline{\alpha} x| C_p + C_p$ where
$|\underline{\alpha} x|$ is the cross product matrix.
$\underline{\alpha}$ is applied as an input to algorithm 39 from the Kalman filter 50.

The $\underline{C}$ vector is applied to the algorithm 39 where it continuously adjusts the $\underline{\alpha}$ vector, and $\Delta \bar{r}$ vector outputs of the Kalman filter 50 so that these inputs to the delay correction unit 54, processed as described below, represent current $\underline{C}$ values. These are processed digitally within the CPU to provide a state vector input $\Delta \phi$ to the loops 46 according to the state expression.

$$\Delta \phi = H^T \left[ \frac{\alpha}{\Delta \bar{r}} \right]$$

Since $\underline{\alpha}$ and $\Delta \bar{r}$ are continuously following the $\underline{C}$ vector and periodically are updated by satellite information, the dual effect of inertial responsiveness and satellite accuracy are achieved. The $\underline{H}^T$ matrix is defined as $$H^T = \left[ \frac{\Delta t}{T} \sum_{k=1}^{n} h_k^T, \frac{2\pi}{\lambda} \hat{1}\Delta r \cdot 1R \right],$$

n being an arbitrary number of time segments $\Delta t$, where $n\Delta T = T$, T being defined below; and where $\hat{1}\Delta r$ and $1R$ are the unit vectors between antennas, and between the system and the satellite respectively. hk is the cross product between these vectors defined as $\frac{2\pi}{\lambda} \hat{1}r (t_k) X 1R(t_k) \cdot 1R$ is provided to the unit 54, as well as elsewhere, from normal operation of the receiver 42 while $\hat{1}\Delta r$ is obtained from the filter 50.

The Kalman filter 50 requires addition input data in matrix form. This data includes the covariance matrix $|P|$. This has the form of a $12 \times 12$ matrix in which the major diagonal is the expected values for $(x - \bar{x})(x - \bar{x})^T$. $|P_0|$ is provided in a register 55 for the first iteration.

$|P|$ is calculated by the Kalman filter 50 for all future iterations according to the operating expressions shown below. These expected values reflect the initial attitude uncertainty of typically less than one degree. The $|Po|$ diagonals will then be $(1°)^2$ for each attitude vector state. An $|R|$ register 53 is set with estimated noise-to-signal ratio (N/S) for each received signal. Typically these can be set in advance and held constant although continuous N/S monitoring and register resetting to each N/S value may be used. The $|R|$ matrix has the form $$R = \begin{bmatrix} r & c & c \\ c & r & c \\ c & c & r \end{bmatrix}$$

for each satellite where $$r = \frac{1}{T}(4b(N/S)^2 + 2N/S) + 1\frac{(2\pi)^2}{12\,Q}\,;\, c = \frac{N/S}{T}$$

and where the delay produced in each loop 46, to be described below, is represented as $1/Q$ fractions of a wavelength.

Using $\hat{x}^T = [\underline{\alpha}^T, \Delta \underline{r}^T, \underline{b}^T, \underline{\psi}^T]$ With $\hat{x}$ thus defined, the describing function of a Kalman filter is:

$\dot{\underline{x}} = F\underline{x} + \underline{n}$ where F is a matrix $$F = \begin{bmatrix} o & o & c & c \\ o & o & o & o \\ o & o & o & o \\ o & o & o & -\beta I \end{bmatrix}$$

where C is provided by the inertial measurement unit, algorithm 39 and $\beta$ is defined by the relationship $\dot{\psi} = -\beta \psi + n$ (n being noise) and is the time constant of the first order Markov process. $\beta$ is typically provided to the Kalman filter 50 as a constant from a register 51.

In implementing the Kalman filter 50 digitally the values of the vector, $\hat{x}$, are discretely calculated at time separated intervals k, K−1, k−2, etc. $\hat{x}_k(+)$, the new estimate is calculated as the sum of $\hat{x}_k(-)$, the old estimate, with a function of the inputs from the various sources illustrated in FIG. 4 as defined above. The definition of the state estimate update is $\hat{x}(+) = \hat{x}_k(-) + K_k[Z_k - H_k\hat{x}_k(-)]$ and is the basic processing provided by the Kalman filter 50. The variable, satellite information containing input is the factor $Z_k$ which is defined as an average of the output of each loop 46, one for each state of the vector $\hat{x}_k$, over a period T.

$$z_k = \frac{1}{T} \int_\delta^T \Delta \phi dt$$

As is shown below, voltage to frequency conversion of the output of each loop 46 and accumulation in a counter produces each state variable in the $Z_k$ vector. The Kalman filter thus periodically receives a new or updated $Z_k$ and provides a new $\hat{x}_k(+)$, which is the output, the state vector comprising $\underline{\alpha}$, $\Delta \underline{r}$, $\underline{b}$ and $\underline{\psi}$ as defined above. The $H_k$ input has been defined above, involving the unit vectors between antennas and to the satellite. $K_k$ is defined as:

$$P_k(-) = \Phi_{k-1}P_{k-1}(+)\Phi_{k-1}^T + Q_{k-1}$$

$$K_k = P_k(-)H_k^T[H_k P_k(-)H_k^T + R_k]^T;$$

$$P_k(+) = [I - k_k H_k]\, P_k(-)$$

in which the data in registers 55 and 53 provide the initial, Po data and the R data, either constant or variable as noted above.

The above expression for $\hat{x}_k(+)$ essentially updates the $\hat{x}$ value at $t_k$, a discrete sampling time, from its value just prior to the $t_k$ sampling time to the optimal estimate just after the $t_k$ sampling time using new $Z_k$ data $Z_k$ tracks both satellite and inertial outputs. T typically is $t_k - t_{k-1}$.

Between $t_{k-1}$ and $t_k$ the Kalman filter follows the driving function $\dot{\underline{x}} = F\underline{x} + \underline{n}$ noted above, in the state vector notation this driving function is, $$\hat{x}_k(-) = \Phi_{k-1}\hat{x}_{k-1}(+)$$

which estimates $\hat{x}$ just before the $t_k$ update as a function of $\hat{x}$ just after the $t_{k-1}$ update. $\Phi_{k-1}$ which drives this transformation is:

$$\Phi_{k-1} = \int_{k-1}^k F(t)dt \quad \text{where, as defined above}$$

$$F(t) = \begin{bmatrix} o & o & c(t) & c(t) \\ o & o & o & o \\ o & o & o & o \\ o & o & o & -\beta I \end{bmatrix}$$

The $\Phi$ function thus follows the C(t) inputs from the inertial measurement unit algorithm 39 between samples.

The actual programming used to implement these relationships will depend on the power and nature of the processor 48. The brevity of the matrix notation has simplified the description of the processing steps which may be far more lengthy in the processing language chosen, but will be the result of routine mathematical development of state space x solutions to simultaneous equations well known in the art.

The delay correction unit 54 receives data from a local input source 56 for initialization of the system with estimates of attitude typically to within 5°. These estimates can be provided by any convenient means including other navigation sources of relatively less accuracy or dynamic handling capability. These inputs are used to set the values forth $\Delta n$ in the delays of loops 46 described below.

Initialization information on attitude instead of being applied through the local input 56 can be developed in the inertial measurement unit by gyrocompassing techniques as known in the art.

With respect now to FIG. 5 the details of the individual loops 46 are illustrated. (Instead of plural loops 46, multiplexing techniques may be used with a single loop.) First and second signals are received by respective antenna as 36 and 34, in an exemplary case, and applied to mixers 60 and 62. The mixers 60 and 62 also receive the code signal from the satellite receiver 42 for the particular satellite associated with that loop and operate to recover pure carrier at the outputs of each mixer. These carrier signals are applied through bandpass filters 64 and 66 of a narrow bandwidth centered about the carrier frequency. The output of the filter 64, representing the signal received over the farthest path from the satellite, is applied to a mixer 68 along with the output of a delay circuit 70. The delay circuit 70, typically an analog delay circuit utilizing charge coupled devices, responds to the output of the filter 66 representing the filtered carrier of the first received signal. The output signal from the delay correction unit 54 appropriate to that loop is applied to the delay circuit 70 to define its delay as a quantity $\Delta n$ representing whole numbers of cycles of phase difference (accumulated over time or from initial conditions) plus the quantity $\Delta \phi$ representing the adjustment in phase within a whole cycle. $\Delta \bar{\phi}$ is the phase error estimate from the Kalman filter and is applied to delay circuit 70 to produce a new total delay $\Delta n + \Delta \bar{\phi}$ for each $\Delta \bar{\phi}$ estimate. The output from the delay circuit 70 is applied to a second input of the mixer 68. The output of the mixer 68 is a signal whose D.C. value represents the phase difference between the two received signals minus the estimated difference provided by the delay circuit 70 and is in effect the value of the error component in that difference times the square of the signal level of the incoming satellite signal. This output is applied through a filter 72 to limit the signal to that D.C. component which is in turn applied to a voltage-to-frequency converter 74. The resulting pulse string is applied to a counter 76 within the central processng unit 48. The counter 76 accumulates pulses over the period T corresponding to the integration period noted above.

This value will have two variables, one the phase error and the other the magnitude of the signal strength, squared. In order to permit elimination of the signal strength variable, the output of the filter 64 is applied to a first input of a further mixer 80 along with a further output of the delay circuit 70 which represents the signal applied to the mixer 68 from delay 70 with a small additional delay. The output of the mixer 80 is thus equivalent to the output of the mixer 68 with an additional constant phase term imposed. The output of those two mixers are differenced in a circuit 82 to produce an output which is the square of the signal level times the small, but constant delay difference. This is narrow banded filter in a filter 84 and applied through an analog-to-digital converter 86 to the central processing unit 48. This makes available a quantity depended only upon the received signal level for its evaluation which is, within the central processing unit 48, used to eliminate the signal strength from the output of the counter 76 and thus produce the state output $Z_k$ appropriate to that loop.

This completes the loop through the Kalman filter for the satellite signal and finishes the exemplary description of the system as a whole. The system output is taken from the algorithm 39. The following claims define the scope of the invention and are provided as the sole determinate of that scope.

What is claimed is:

1. An attitude sensing system comprising:
    a satellite receiver operative to respond on an interferometric array of receiving antennas to satellite generated signals to provide a plurality of output signals representative of the phase difference in signals received between plural ones of said antennas and reflecting relative attitudes between said array and the satellite;
    an inertial measurement unit positionally associated with said satellite receiver and operative to provide an output representing an attitude vector of said sensing system in inertial space; and
    means for combining said output signals from said satellite receiver and said output from said inertial measurement unit for adjusting said inertial measurement unit output with attitude information from the satellite, wherein
    said satellite receiver includes:
        at least three antennas physically separated from each other and each receiving a signal from one or more navigation satellites with a phase characteristic of the attitude of said three antennas relative to said navigation satellite;
        a plurality of phase comparing loops each responsive to the output of two of said plural antennas for each satellite and operative to provide an adjustment in the phase of the output of one said antenna relative to the other tending to reduce the phase difference therebetween and to produce an error output signal representative of remaining phase difference;
        a digital filter responsive to the phase error output of each phase comparing loop to provide an estimate of attitude of said three or more antennas relative to said satellite and a vector error estimate signal; and
        delay correction means for providing a phase error estimate signal in response to said vector error estimate signal, wherein
        each said phase comparing loop is responsive to at least said phase error estimate signal to provide adjustment in said phase comparing loops tending to reduce the remaining phase difference between the signals from the two antennas applied thereto.

2. The system of claim 1 wherein said combining means includes means for identifying errors of said inertial measurement unit and for providing corrections therefore in said output of said inertial measurement unit.

3. The system of claim 1 wherein:
    said combining means is further operative to provide outputs representative of gyroscope errors; and
    means are provided, in response to said gyroscope error outputs, to provide calibration of said inertial measurement unit output tending to reduce the effect of said errors therein.

4. The system of claim 1 wherein
    said combining means includes means for providing an initial phase adjustment in response to received satellite position data and estimated system position.

5. An attitude sensing system comprising:
    an inertial measurement unit providing an attitude representing output;
    a satellite receiver receiving satellite signals on an array of antennas to provide signals representing phase differences between each antenna of said array; and
    digital filter means operative in response to said attitude representing output and said phase difference signals to provide a state signal and a phase error estimate signal periodically updated as a function of said phase difference signals and between updates as a function of the attitude signal and said state signal at the last update wherein,
    said phase error estimate signal is received by said satellite receiver for adjusting signals representing phase differences between each antenna of said array.

* * * * *

UNITED STATES PATENT AND TRADEMARK OFFICE
CERTIFICATE OF CORRECTION

PATENT NO. : 4,754,280  Page 1 of 3
DATED : June 28, 1988
INVENTOR(S) : Alison K. Brown, W. Michael Bowles, & Tom P. Thorvaldsen It is certified that error appears in the above-identified patent and that said Letters Patent is hereby corrected as shown below:

Column 1, line 22, "therefor" should read --therefore--.

Column 2, line 24, "ia" should read --is--.

Column 2, line 28, "in the" should read --to the--.

Column 3, line 48, "characteristics" should read --characteristic--.

Column 4, line 19, "As" should read --At--.

Column 4, line 67, "representiang" should read --representing--.

Column 5, line 48, "50 is x," should read --50 is,--.

Column 5, line 56, "$[\underline{\alpha}^T, \{\Delta r^T, b^T, \psi^T];$" should read --$[\underline{\alpha}^T, \{\Delta r\}^T, \underline{b}^T, \underline{\psi}^T];$--

Column 5, line 64, "later" should read --latter--.

Column 6, line 24, "$C = |\underline{\alpha}x|Cp + Cp$" should read --$\underline{C} = |\underline{\alpha}x|\underline{C}p + Cp$--.

Column 6, line 40, "$\Delta\phi = H^T [\frac{\alpha}{\Delta r}]$" should read --$\Delta\phi = \underline{H}^T [\frac{\alpha}{\Delta \underline{r}}]$--

UNITED STATES PATENT AND TRADEMARK OFFICE
CERTIFICATE OF CORRECTION

PATENT NO. : 4,754,280

DATED : June 28, 1988

INVENTOR(S) : Alison K. Brown, W. Michael Bowles, & Tom P. Thorvaldsen

It is certified that error appears in the above-identified patent and that said Letters Patent is hereby corrected as shown below:

Column 6, line 50, "$H^T = [\frac{\Delta t}{T} \sum_{k=1}^{n} h_k{}^T, \frac{2\pi}{\lambda} \hat{1}\Delta r \cdot 1R],$" should read $$--\underline{H}^T [\frac{\Delta t}{T} \sum_{k=1}^{n} h_k{}^T, \frac{2\pi}{\lambda} \underline{\hat{1}}\Delta r \cdot 1R],--.$$

Column 6, lines 58-61, "$\frac{2\pi \hat{1}r}{\lambda}(t_k) X 1R(t_k) \cdot 1R$ is provided" should read $--\frac{2\pi}{\lambda} \underline{\hat{1}}r(t_k) \times \underline{1}R(t_k). \underline{1}R$ is provided--.

Column 6, line 64, "addition" should read --additional--.

Column 7, line 27, "$\hat{\underline{x}}^T = [\underline{\alpha}^T, \Delta \underline{r}^T, \underline{b}^T, \psi^T]$" should read $--\hat{\underline{x}}^T = [\underline{\alpha}^T, \Delta \underline{\tilde{r}}^T, \underline{b}^T, \psi^T]--.$ Column 7, line 46, "k, K-1, k-2," should read --k, k-1, k-2,--.

Column 7, line 67, "b and" should read --$\underline{b}$ and--.

UNITED STATES PATENT AND TRADEMARK OFFICE
CERTIFICATE OF CORRECTION

PATENT NO. : 4,754,280

DATED : June 28, 1988

INVENTOR(S) : Alison K. Brown, W. Michael Bowles, & Tom P. Thorvaldsen

It is certified that error appears in the above-identified patent and that said Letters Patent is hereby corrected as shown below:

Column 7, line 68, "$H_k$" should read --$\underline{H}_k$--.

Column 8, line 55, "forth $\Delta n$" should read --for $\Delta n$--.

Column 9, line 20, "mixter 68" should read --mixer 68--.

Signed and Sealed this

First Day of August, 1989

Attest:

DONALD J. QUIGG

*Attesting Officer*    *Commissioner of Patents and Trademarks*